United States Patent
Fischbach et al.

(10) Patent No.: US 6,273,349 B1
(45) Date of Patent: Aug. 14, 2001

(54) FUEL INJECTION VALVE

(75) Inventors: Dirk Fischbach, Bamberg; Michael Bitter, Bietigheim-Bissingen; Rainer Kocik, Bamberg; Günter Dantes, Eberdingen; Detlef Nowak, Untergruppenbach; Jörg Heyse, Markgröningen; Albert Staacke, Steinheim; Michael Klaski, Grossbottwar, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/445,494
(22) PCT Filed: Jan. 29, 1999
(86) PCT No.: PCT/DE99/00233
    § 371 Date: Dec. 8, 1999
    § 102(e) Date: Dec. 8, 1999
(87) PCT Pub. No.: WO99/53191
    PCT Pub. Date: Oct. 21, 1999

(30) Foreign Application Priority Data

Apr. 8, 1998 (DE) ................................................ 198 15 789

(51) Int. Cl.⁷ .............................. B05B 1/30; F02M 51/00
(52) U.S. Cl. ...................... 239/585.1; 239/494; 239/496; 239/533.12; 239/596
(58) Field of Search .......................... 239/533.1–533.9, 239/533.12, 533.14, 461, 382, 389, 466, 467, 468–471, 475, 494, 496, 497, 501, 509, 596, 585.1, 431

(56) References Cited

U.S. PATENT DOCUMENTS

| | | | |
|---|---|---|---|
| 4,974,565 | * 12/1990 | Hashimoto et al. | 239/553.12 |
| 5,241,858 | * 9/1993 | Wieczorek et al. | 239/533.12 |
| 5,570,841 | * 11/1996 | Pace et al. | 239/585.1 |
| 5,766,441 | * 6/1998 | Arndt et al. | 239/596 |

FOREIGN PATENT DOCUMENTS

| | | | |
|---|---|---|---|
| 39 43 005 | 5/1990 | (DE) | 239/533.12 |
| 42 21 185 | 1/1994 | (DE) | 239/533.12 |
| 196 07 288 | 10/1996 | (DE) | 239/533.12 |
| WO 96/11335 | 4/1996 | (WO) | 239/553.12 |

\* cited by examiner

*Primary Examiner*—David A. Scherbel
*Assistant Examiner*—Steven J. Ganey
(74) *Attorney, Agent, or Firm*—Kenyon & Kenyon

(57) ABSTRACT

A fuel injection valve is described which has a swirl disk downstream from a valve seat, the swirl disk being made of at least one metallic material, having at least two swirl channels opening into a swirl chamber, and in which all layers are adheringly deposited directly one on top of the other by electroplating (multilayer electroplating). The swirl disk is installed in the valve so that the surface normal to its surface forms an oblique angle other than 0° with the longitudinal valve axis, so that a jet angle γ with respect to the longitudinal valve axis is formed due to the orientation of the swirl disk. The fuel injection valve is particularly well suited for direct injection of fuel into the combustion chamber of a compressed mixture externally ignited internal combustion engine.

14 Claims, 7 Drawing Sheets

FUEL INJECTION VALVE

FIELD OF THE INVENTION

The present invention is based on a fuel injection valve.

BACKGROUND INFORMATION

German Patent No. 39 43 005 describes an electromagnetically actuated fuel injection valve, in which a plurality of disk-shaped elements are arranged in the seat area. When the magnetic circuit is excited, a flat valve plate used as a flat armature is lifted from an opposite valve seat plate interacting with it, the valve plate and the valve seat plate jointly forming a valve plate part. A swirl element that sets the fuel flowing to the valve seat in a circular swirling motion is arranged upstream from the valve seat plate. A stop plate limits the axial path of the valve plate on the side opposite the valve seat plate. The valve plate is surrounded by the swirl element with a certain amount of clearance between them; thus the swirl element guides the valve plate to a certain degree. The bottom face of the swirl element is provided with a plurality of tangential grooves, which extend from the outer periphery to a central swirl chamber. Due to the fact that the bottom face of the swirl element rests on the valve seat plate, the grooves have the form of swirl channels.

World Patent 96/11335 describes a fuel injection valve, which has a multidisk pre-swirl atomizer projection on its downstream end. This atomizer projection is provided downstream from a disk-shaped guide element built into a valve seat carrier and a valve seat that is also located on the valve seat carrier, an additional support element holding the atomizer projection in a well-defined position. The atomizer projection is made of two disks or four disks, the individual disks being made of stainless steel or silicon. Therefore, conventional machining operations maybe used in the production of the opening geometries in the disks, such as erosion, punching, and etching. Each individual disk of the atomizer projection is manufactured separately, after which all the disks of the same size are stacked in the desired number to form the full atomizer projection. The atomizer projection extends perpendicularly to the longitudinal valve axis, i.e., it is horizontal, so that injection takes place along the longitudinal valve axis.

German Patent Application No. 196 07 288 describes a multilayer electroplating process for manufacturing perforated plates, which are particularly suitable for use in fuel injection valves. This principle of disk manufacturing by multiple metal electrodeposition of different metallic structures one on top of the other so that a single-piece disk is obtained should be expressly considered part of the disclosure content of the present invention. Microelectroplating in a plurality of levels, layers, or strata is therefore utilized in the manufacture of the swirl disks used here and installed according to the present invention.

SUMMARY

The fuel injection valve according to the present invention has the advantage that it allows a very high quality of atomization of a fuel to be injected and a highly variable jet or spray formation, which is adapted to the individual requirements such as installation conditions, engine configuration, cylinder shape, or spark plug position, to be achieved. As a result, exhaust gas emissions and fuel consumption can be reduced by the use of atomizer disks installed obliquely in the fuel injection valve.

Oblique installation of the atomizer disk allows specific, for example, engine-specific, jet patterns and spray shapes to be produced, which can be particularly advantageous when the fuel injection valve is used for direct injection into a cylinder of an internal combustion engine. The production of a spray or jet inclined with respect to the longitudinal valve axis at an angle $\gamma$ (hollow or solid cone, high or low degree of twist over the periphery, uniform or non-uniform distribution over the periphery, non-rotationally symmetrical (flat) jet patterns with adjustable twist components) in a simple manner represents an advantage of the fuel injection valve according to the present invention.

It is advantageous to design the atomizer disk in the form of a swirl disk. The swirl disk is manufactured in a particularly advantageous manner by multilayer electroplating. Due to their metallic construction, the swirl disks are unbreakable and easy to install. The use of multilayer electroplating provides considerable freedom of design, since the contours of the opening areas (inlet area, swirl channels, swirl chamber, outlet opening) can be freely selected in the swirl disk. In particular, compared to silicon disks, where the contours are strictly predefined due to the crystal axes (truncated pyramid), this flexible shaping is very advantageous.

Metal deposition has the advantage, in particular compared to the manufacture of silicon disks, of a great variety of materials being available. The most diverse metals with their different magnetic properties and hardnesses can be used in the micro-electroplating process for the manufacture of swirl disks. The different hardnesses of the various metals can be used in a particularly advantageous manner by creating a sealing metal area.

It is of particular advantage to construct the swirl disk from three layers in that three electroplating steps are performed for metal deposition. The upstream layer represents a cover element, which fully covers the swirl chamber of a central swirl-producing layer. The swirl-producing layer is made of one or more material regions, which, due to their outlines and geometric position with respect to one another, predefine the outlines of the swirl chamber and the swirl channels. The individual layers are arranged one on top of the other without gaps or joints using an electroplating process so that they represent a completely homogeneous material. In this context, the term "layer" is used only to facilitate understanding.

Two, three, four, or six swirl channels are advantageously provided in the swirl disk. The material regions can have different shapes depending on the desired outline of the swirl channels; they may be stepped or spiral-shaped, for example. Also the outlines of the swirl chamber, the cover layer, and the outlet opening can be configured in a flexible manner.

The static amount of flow is set using the swirl disk by selecting certain opening geometries, while the angle of the actual jet or spray is set using a support element, and spray angle $\gamma$ with respect to the longitudinal valve axis to obtain oblique spraying is set by the oblique installation of the swirl disk.

In engine operation, when gasoline is injected, there is usually the problem that the downstream tip of the injection valve projecting into the combustion chamber becomes coked by gasoline deposits. Therefore, in the conventional injection valves projecting into the combustion chamber, there is the danger of a negative effect on the spray parameters (static flow amount, jet angle), which may even result in injection valve failure. By using a multilayer electroplated atomizer disk at the downstream end of the fuel injection valve made of nickel or nickel-cobalt, coking in this region is effectively prevented. Suitable materials also include cobalt and nickel oxides and oxides of alloys of these metals. By constructing the atomizer disk of such materials, full combustion of the soot particles is catalyzed and deposition of carbon particles is prevented. Also precious metals such as Ru, Rh, Pd, Os, Ir, and Pt and alloys of these metals with each other or with other metals exhibit a catalytic effect.

Oblique installation is particularly well suited for atomizer disks made of a plurality of metal sheets, in particular for swirl disks.

Figure 1:
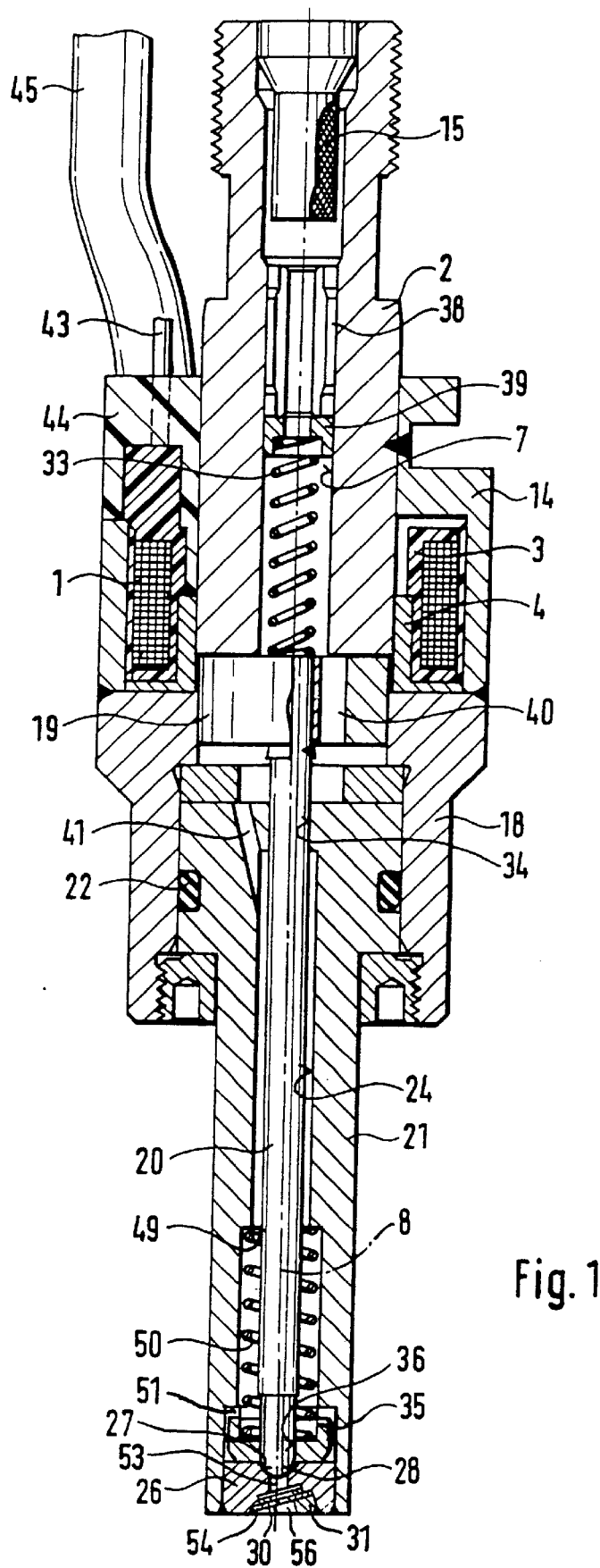
FIG. 1 shows a cross section of a fuel injection valve according to the present invention.

The electromagnetically actuated valve shown in FIG. 1 as an example in the form of an injection valve for fuel injection systems of compressed mixture, externally ignited internal combustion engines has a tubular, largely hollow cylindrical core 2 serving as the internal pole of a magnetic circuit, which is at least partially surrounded by a magnet coil 1. The fuel injection valve is well suited in particular to serve as a high-pressure injection valve for direct injection of fuel into the combustion chamber of an internal combustion engine.

A plastic bobbin 3, which is stepped, for example, accommodates the winding of magnet coil 1 and allows, in conjunction with core 2 and an annular, non-magnetic intermediary part 4, partially surrounded by magnet coil 1 and having an L-shaped cross section, the injection valve to have a particularly compact and short design in the area of magnet coil 1.

Core 2 has a longitudinal through hole 7, which extends along longitudinal valve axis 8. Core 2 of the magnetic circuit also serves as a fuel inlet fitting, with longitudinal hole 7 representing a fuel supply channel. An external metal (e.g., ferritic) housing part 14 is firmly attached to core 2 above magnet coil 1 closing the magnetic circuit as the external pole and outer conduction element and fully surrounds magnet coil 1 at least in the circumferential direction. A fuel filter 15, responsible for removing fuel components that due to their size might clog or damage the injection valve, is provided on the inlet side of longitudinal hole 7 in core 2. Fuel filter 15 is installed in core 2 by pressing, for example.

Core 2 forms, together with housing part 14, the inlet end of the fuel injection valve, with top housing part 14, viewed in the axial downstream direction, for example, slightly extending beyond magnet coil 1. A tubular bottom housing part 18, which surrounds and accommodates an axially movable valve part having an armature 19, a rod-shaped valve needle 20, and a longitudinal valve seat carrier 21, is sealingly attached to top housing part 14. The movable valve part can also take the form of a flat disk with an integrated armature, for example. The two housing parts 14 and 18 are permanently attached to one another by a circumferential weld, for example.

In the embodiment illustrated in FIG. 1, bottom housing part 18 and largely tubular valve seat carrier 21 are firmly screwed together; however, joining methods may also include welding, soldering, or crimping. An annular gasket 22, for example, ensures the seal between housing part 18 and valve seat carrier 21. Valve seat carrier 21 has an internal through hole 24 running through its entire axial extension, concentrically to longitudinal valve axis 8.

With its lower end 25, which also represents the downstream end of the entire fuel injection valve, valve seat carrier 21 surrounds a valve seat element 26, having a valve seat surface 27, inserted in through hole 24, which is tapered in the shape of a truncated cone in the downstream direction. Valve needle 20, which is rod-shaped, for example, having a basically circular cross section, is arranged in through hole 24, and has a valve closing section 28 at its downstream end. This valve closing section 28, which is conically tapered, for example, interacts with a valve seat surface 27 provided in valve seat element 26 in a known manner.

Downstream from valve seat surface 27, in a depression 54 of valve seat element 26, there is a swirl disk 30 installed obliquely according to the present invention, which is referred to as swirl disk 30 in the embodiments due to its geometry and its special function. Oblique installation is to be understood so that atomizer disk 30 has a normal to its surface that forms an angle other than 0° with longitudinal valve axis 8, so that a jet angle γ is obtained with respect to longitudinal valve axis 8 due to the inclination of atomizer disk 30.

Swirl disk 30 is manufactured, for example, by multilayer electroplating and has three metallic layers, for example, deposited one on top of the other. Furthermore, a support element 31 is installed in depression 54 downstream from swirl disk 30.

The injection valve is actuated electromagnetically in a conventional manner. The electromagnetic circuit with magnet coil 1, core 2, housing parts 14 and 18, and armature 19 are used to move valve needle 20 axially and thus to open the injection valve against the elastic force of a restoring spring 33 arranged in longitudinal hole 7 of core 2 and to close it. Armature 19 is attached, by a weld for example, to the end of valve needle 20 facing valve closing section 28 and aligned with core 2. A guide hole 34, provided in valve seat carrier 21 on the end facing armature 19, and a guide element 35, arranged upstream from valve seat element 26 having an accurately dimensioned guide hole 36, are used to guide valve needle 20 during its axial motion with armature 19 along longitudinal valve axis 8. Armature 19 is surrounded by intermediary part 4 during its axial motion.

Instead of the electromagnetic circuit, another excitable actuator, such as a piezostack, can also be used in a comparable fuel injection valve, or the axially movable valve part can be actuated by hydraulic pressure or servo pressure.

An adjusting sleeve 38, inserted, pressed in or screwed into longitudinal hole 7 of core 2 is used for adjusting the pre-tension of a restoring spring 33, whose upstream end rests on adjusting sleeve 38 via centering piece 39, and whose opposite end is supported by armature 19. One or more bore-like flow channels 40 are provided in armature 19, through which the fuel can flow from longitudinal hole 7 in core 2 via flow channels 41 formed downstream from flow channel 40 near guide hole 34 in valve seat carrier 21 into through hole 24.

The lift of valve needle 20 is defined by the position of valve seat element 26. One end position of valve needle 20 when magnet coil 1 is not excited is defined by the contact of valve closing section 28 with valve seat surface 27 of valve seat element 26, while the other end position of valve needle 20 when magnet coil 1 is excited is defined by the contact of armature 19 with the downstream face of core 2. The surfaces of the components of the latter stop area are chrome plated, for example.

Magnet coil 1 is electrically contacted and thus excited via contact elements 43, which are provided with a plastic coating 44 outside bobbin 3. Plastic coating 44 can also extend to other components such as housing parts 14 and 18 of the fuel injection valve. An electric connecting cable 45, which powers magnet coil 1, extends from plastic coating 44. Plastic coating 44 extends through top housing part 14, which is interrupted in this area.

Downstream from guide hole 34, through hole 24 of valve seat carrier 21 is designed with two shoulders, for example. A first shoulder 49 is used as the contact surface for a compression spring 50, which may be a helical spring, for example. With second shoulder 51, a larger space is created for the two disk-shaped elements 35 and 26. Compression spring 50, which envelops valve needle 20, pre-tensions guide element 35 in valve seat carrier 21, since it presses against guide element 35 with its side opposite shoulder 49. Downstream from valve seat surface 27, an outlet opening 53 is provided in valve seat element 26, through which fuel flows along valve seat surface 27 when the valve is open and subsequently enters swirl disk 30 and support element 31. While perforated spray disk 31 is permanently connected to valve seat element 26, for example, by welding or gluing, swirl disk 30 is clamped or pressed in depression 54, since perforated spray disk 31 supports swirl disk 30 from below. The attachment version of swirl disk 30 illustrated in FIG. 1 is shown schematically only and only illustrates one of a plurality of attachment options; other example variants can be seen in FIGS. 3 through 9. A central outlet hole 56, through which the swirling fuel leaves the fuel injection valve, is formed in support element 31.

Figure 2:
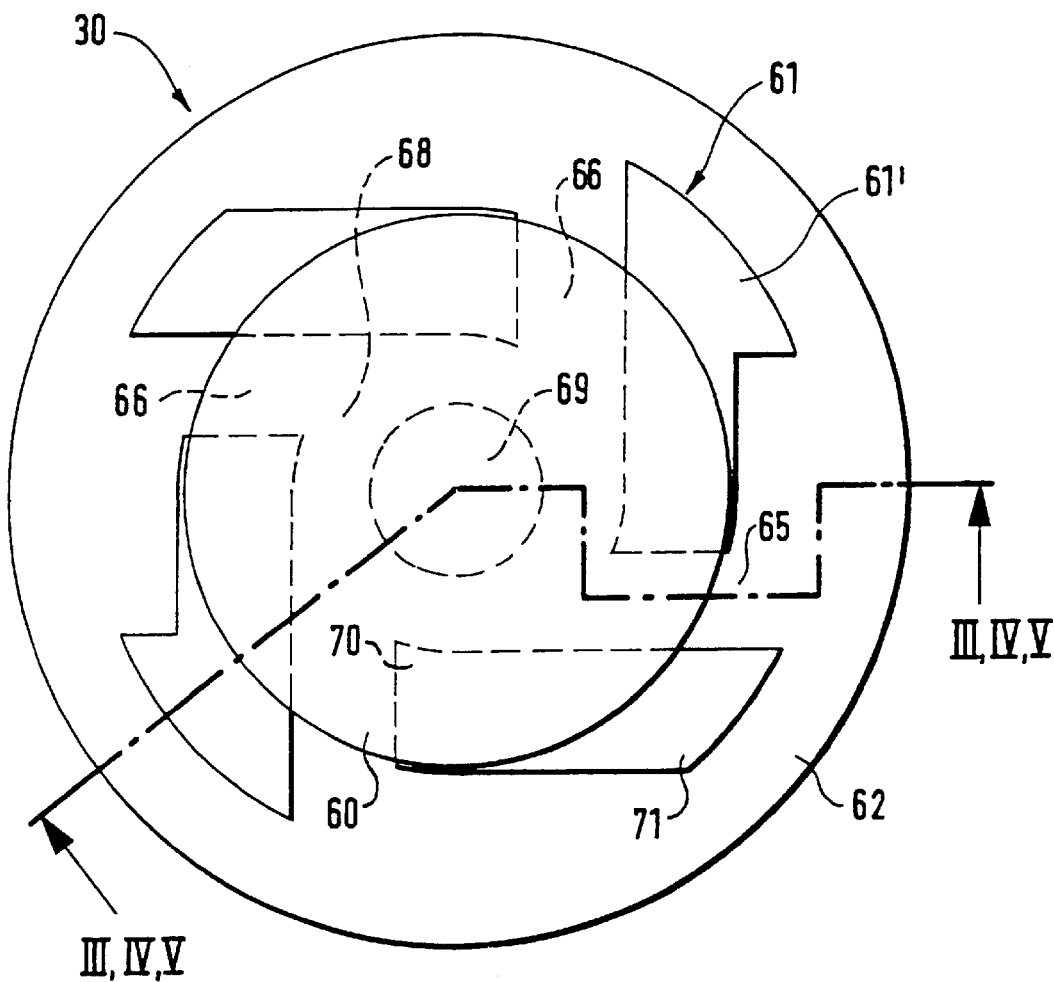
FIG. 2 shows a multilayer electroplated swirl disk obliquely installed in a fuel injection valve.

FIG. 2 shows a top view of a swirl disk 30 having one of an infinite number of geometries as an example. Such a swirl disk 30 is a single-part component, since the individual layers are deposited directly on one another, rather than being subsequently joined together. The layers of swirl disk 30 are electrodeposited consecutively, so that each subsequent layer is bonded to the layer below it by galvanic adhesion.

Swirl disk 30 is formed by three layers electrodeposited one on top of the other, which therefore directly follow one another in the direction of the flow when the swirl disk is installed. The three layers of swirl disk 30 are identified hereinafter according to their function as cover layer 60, swirl producing layer 61 and bottom layer 62. The top cover layer 60 has a smaller outer diameter than bottom layer 62. In this manner, it is ensured that the fuel can flow by outside cover layer 60 and thus can enter unimpeded into the outer inlet areas 65 formed by four swirl channels 66, for example, in central swirl producing layer 61. Swirl disk 30 can also be manufactured so it has more than three layers, the structure of the above-described layers 60, 61, 62 has a comparable appearance to that described above, but, for example, a fourth (not illustrated) structure layer, which may be useful for certain construction conditions and because of the oncoming flow, is deposited on cover layer 60.

Upper cover layer 60 represents a closed metallic layer, which has no opening areas for the passage of the flow. On the other hand, a complex hole outline is provided in swirl producing layer 61, which runs through the entire axial thickness of this layer 61. The hole outline of the central layer 61 is formed by an internal, for example, circular, swirl chamber 68 and a plurality of swirl channels 66 opening into swirl chamber 68. The fuel receives a rotating impulse through the tangential opening of swirl channels 66 into swirl chamber 68, and this impulse is preserved even in a central circular outlet hole 69 of bottom layer 62. The diameter of outlet hole 69 is, for example, considerably smaller than the opening width of swirl chamber 68, located immediately over it. This intensifies the swirl produced in swirl chamber 68. The fuel is sprayed by the centrifugal force in the shape of a hollow cone.

Figure 3:
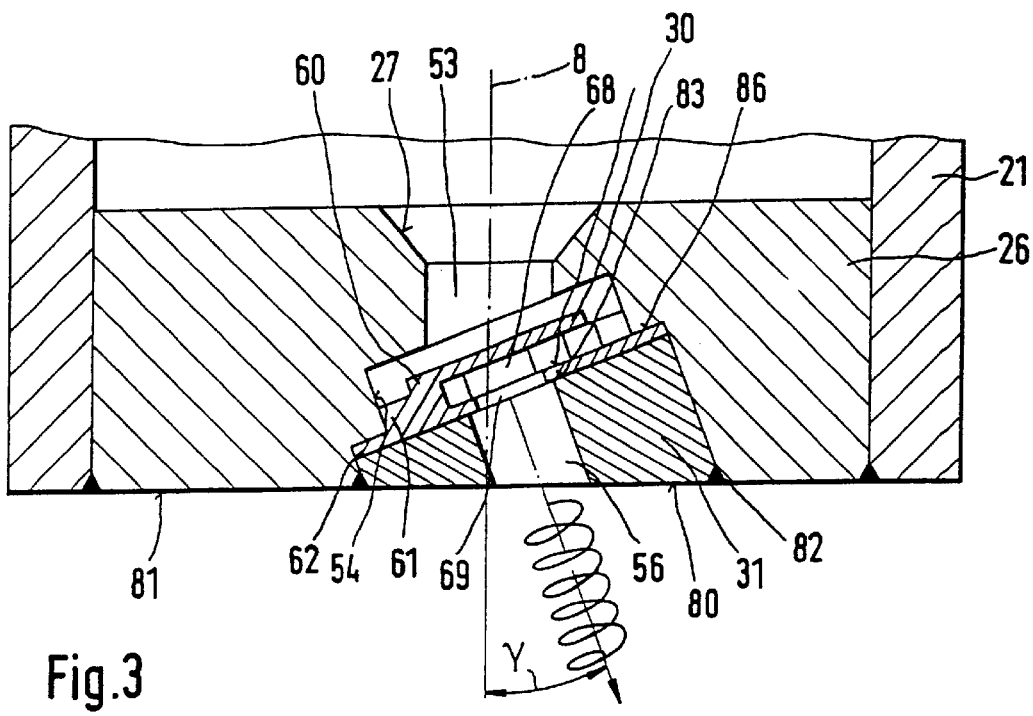
FIG. 3 shows a first embodiment of a downstream valve end according to the present invention, taken along lines III—III of FIG. 2.
Figure 4:
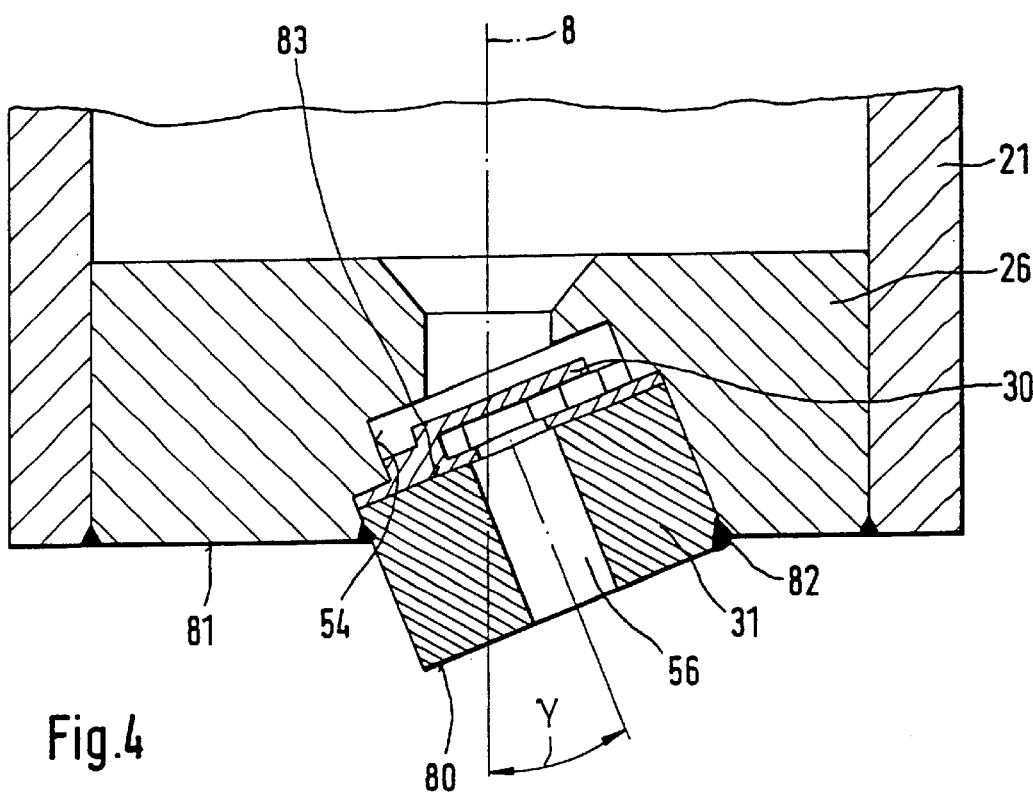
FIG. 4 shows a second embodiment of a downstream valve end according to the present invention, taken along lines IV—IV of FIG. 2.
Figure 5:
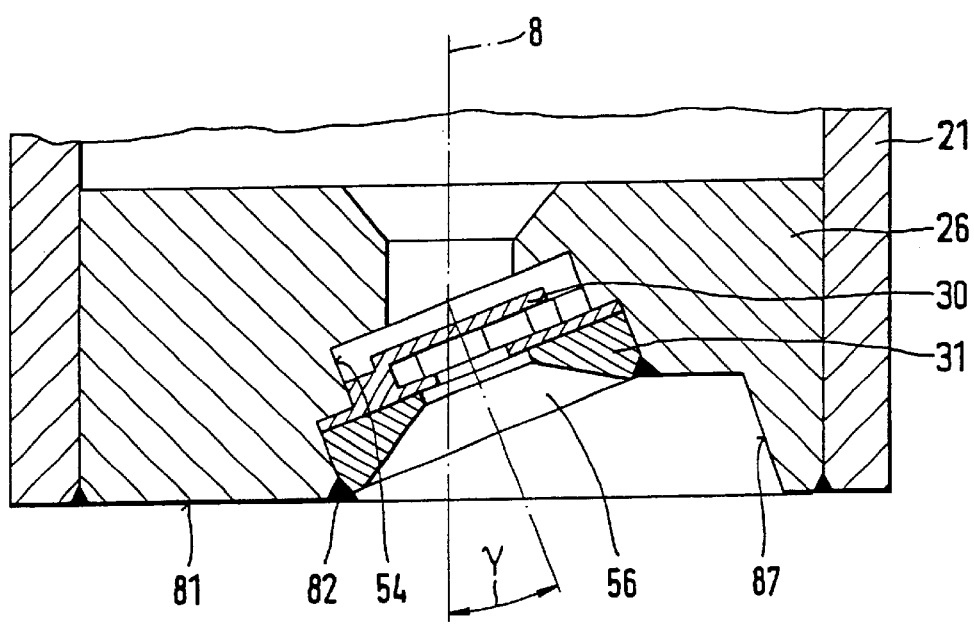
FIG. 5 shows a third embodiment of a downstream valve end according to the present invention, taken along lines V—V of FIG. 2.

The outlines of swirl chamber 68 and swirl channels 66 are defined by material regions 61' of swirl producing layer 61. Material regions 61' are stepped and at a distance from the outer edge of swirl disk 30. The four material regions 61' are largely perpendicular to the respective adjacent material regions 61' and form swirl channels 66, covered by cover layer 60, at a certain distance from one another. Ends 70 of material regions 61', which radially delimit swirl chamber 68, are rounded in the shape of a shovel, for example, so that the outline of material regions 61' produces swirl in the fuel to be injected, and forms a circular swirl chamber 68. Ends 71 of material regions 61', located opposite ends 70, also have rounded and, for example, also widened external outlines, defining a joint diameter, with which swirl disk 30 can be inserted and fastened, for example, in depression 54 in a simple manner (FIGS. 3 through 5).

Swirl disk 30 is designed to have a plurality of layers produced by electrodeposition (multilayer electroplating). Due to its manufacture by deep lithographic electroplating, there are specific features in shaping, some of which are briefly described below:

layers having uniform thicknesses over the disk surface;
 largely perpendicular slits in the layers due to deep lithographic structuring, forming wetted hollow spaces (approximately 3° deviations from the optimally perpendicular walls may occur due to manufacturing tolerances);
 desirable undercuts and overlaps of the slits due to the multilayer design of the individually structured metallic layers;
 slits with any desired cross section shapes having walls that are largely parallel to the axis;
 single-part design of the swirl disk, since the individual metal depositions are made directly one on top of the other.

The method of manufacturing swirl disks 30 is briefly described in the following paragraphs. All steps of the electroplating method of producing a perforated disk have been described in German Patent Application No. 196 07 288. The characteristic feature of the method of successively using photolithographic steps (UV deep lithography) and subsequent microelectroplating is that it ensures high precision of the structures even on a large-surface scale, so that it is ideal for use in mass manufacturing of a very high number of pieces (high batchability). A plurality of swirl disks 30 can be manufactured simultaneously from a single wafer.

The point of departure of the method is a flat and stable substrate, which may be made of metal (titanium, steel), silicon, glass, or ceramic. Optionally at least one auxiliary layer is applied to the substrate initially. This may be a plating start layer (e.g., TiCuTi, CrCuCr, Ni), which is needed for conducting current in the subsequent microelectroplating step. The auxiliary layer is applied, for example, by sputtering or currentless metal deposition. After this pretreatment of the substrate, a photoresist is applied to the entire surface of the auxiliary layer, for example, by rolling or centrifugal coating.

The thickness of the photoresist should be the same as that of the metal layer to be applied in the subsequent electroplating step, i.e., the thickness of bottom layer 62 of swirl disk 30. The resist layer may have one or more layers of a photostructurable sheet or a liquid resist (polyimide, photoresist lacquer). If a sacrificial layer is to be electroplated onto the subsequently produced resist structures, the thickness of the photoresist must be increased by the thickness of the sacrificial layer. The metal structure to be achieved is transferred to the photoresist with a reverse photolithographic mask. One option is to expose the photoresist directly to UV light (printed circuit imaging or semiconductor imaging system) over the mask (UV deep lithography) and to subsequently develop it.

The resulting negative structure in the photoresist for subsequent layer 62 of swirl disk 30 is electrically filled with metal (e.g., Ni, NiCo, NiFe, NiW, Cu) (metal deposition). The metal is in close contact with the outline of the negative structure due to electroplating, so that the predefined outlines are accurately reproduced in it. In order to structure swirl disk 30, the steps starting from the optional application of the auxiliary layer must be repeated according to the number of desired layers, so that for a three-layer swirl disk 30 three electroplated layers are deposited. Different metals can also be used for the layers of swirl disk 30, with only one being used in each new electroplated layer.

In producing cover layer 60 of swirl disk 30, metal is deposited on both the conducting material regions 61' and the non-conducting photoresist in the area of swirl channels 66 and swirl chamber 68. For this purpose, a start layer of metal plating is applied to the resist of the previous middle layer 61. After depositing the upper cover layer 60, the remaining photoresist is removed from the metal structures by web chemical stripping. For smooth, passivated substrates, swirl disks 30 can be removed from the substrate and cut into individual pieces. For substrates with good adhesion of swirl disks 30, the sacrificial layer is selectively etched away from the substrate and swirl disk 30, which allows swirl disks 30 to be removed from the substrate and cut into individual pieces.

FIGS. 3 through 9 show seven different embodiments of the valve ends, designed according to the present invention with obliquely installed swirl disks 30, which have the same basic design as the downstream valve ends of FIG. 1.

Swirl disk 30 and support element 31 are arranged in stepped depression 54, made obliquely in valve seat element 26, bottom face 80 of support element 31 ending flush with bottom face 81 of valve seat element 26, in the exemplary embodiment of FIG. 3, whereby the downstream end of the entire fuel injection valve is also formed together with valve seat carrier 21. Support element 31 is permanently attached to valve seat element 26 via an annular weld 82, produced by a laser, for example.

Swirl disk 30 rests on the top face 83 of support element 31, facing valve seat surface 27, bottom layer 62 of swirl disk 30 in turn being brought into a fixed position on a shoulder 86 of depression 54. Since depression 54 has, in the area above shoulder 86, a diameter that corresponds to the diameter of the joint of material regions 61' of swirl disk 30, swirl disk 30 can be accurately fitted in depression 54. In order to prevent swirl disk 30 from slipping, support element 31 presses swirl disk 30 on shoulder 86 of depression 54 toward valve seat surface 27. Support element 31 has an outer diameter that is approximately equal to the opening diameter of depression 54. Depression 54 can be produced by boring, turning, eroding or stamping, for example.

The diameter of outlet opening 56 is, for example, only insignificantly greater than the diameter of outlet opening 69 of swirl disk 30. The static amount of flow is determined by outlet opening 69 of swirl disk 30, while the diameter of outlet opening 56 is responsible, among other things, for the spray angle of the fuel being sprayed.

For direct gasoline injection, injection valves located directly on the combustion chamber and injecting a spray at an angle to longitudinal valve axis 8 are advantageous, for example, due to certain installation conditions. A swirling, possibly rotationally symmetrical hollow conical spray with uniform distribution over the hollow cone should be produced.

Possible variations of such specifications are shown in FIGS. 3 through 9. One common feature of all the embodiments shown is that swirl disk 30 is installed obliquely with respect to longitudinal valve axis 8, so that outlet opening 69 defines an oblique direction of spray, which is also preserved in outlet opening 56 of support element 31, which also has an oblique orientation. Outlet opening 56 therefore ends off center at bottom face 80, the inclination of outlet opening 56 determining the spray angle of the overall spray to longitudinal valve axis 8. The direction of the jet is identified with an arrow and γ, γ indicating the angle of the spray to longitudinal valve axis 8.

In the other embodiments of the following figures, the same parts or parts having the same functions as in FIG. 3 are identified with the same reference symbols and are not explained in more detail. Attention is only called to the differences and particularities.

The valve end in FIG. 4 is mainly characterized by a different support element 31. Cylindrical support element 31 projects downstream from depression 54 via bottom face 81 of valve seat element 26. Weld 82 runs, due to the oblique position of support element 31, along the periphery of support element 31 once from face 80 almost to face 83 and back in the form of an ellipse.

FIG. 5 shows a shorter support element 31 having a conically widening outlet opening 56 in the downstream direction. Support element 31 is fully accommodated in depression 54. It only projects to bottom face 81 of valve seat element 26 in one area. In order to apply circular weld 82, depression 54 is wider by a cutout 87 toward face 81 over a large peripheral area. Weld 82 does not extend along face 81, but is annular, according to the inclination of depression 54 and support element 31. The installation option is selected depending on the conditions of the combustion chamber, possibly preventing coking of the valve tips.

Figure 6:
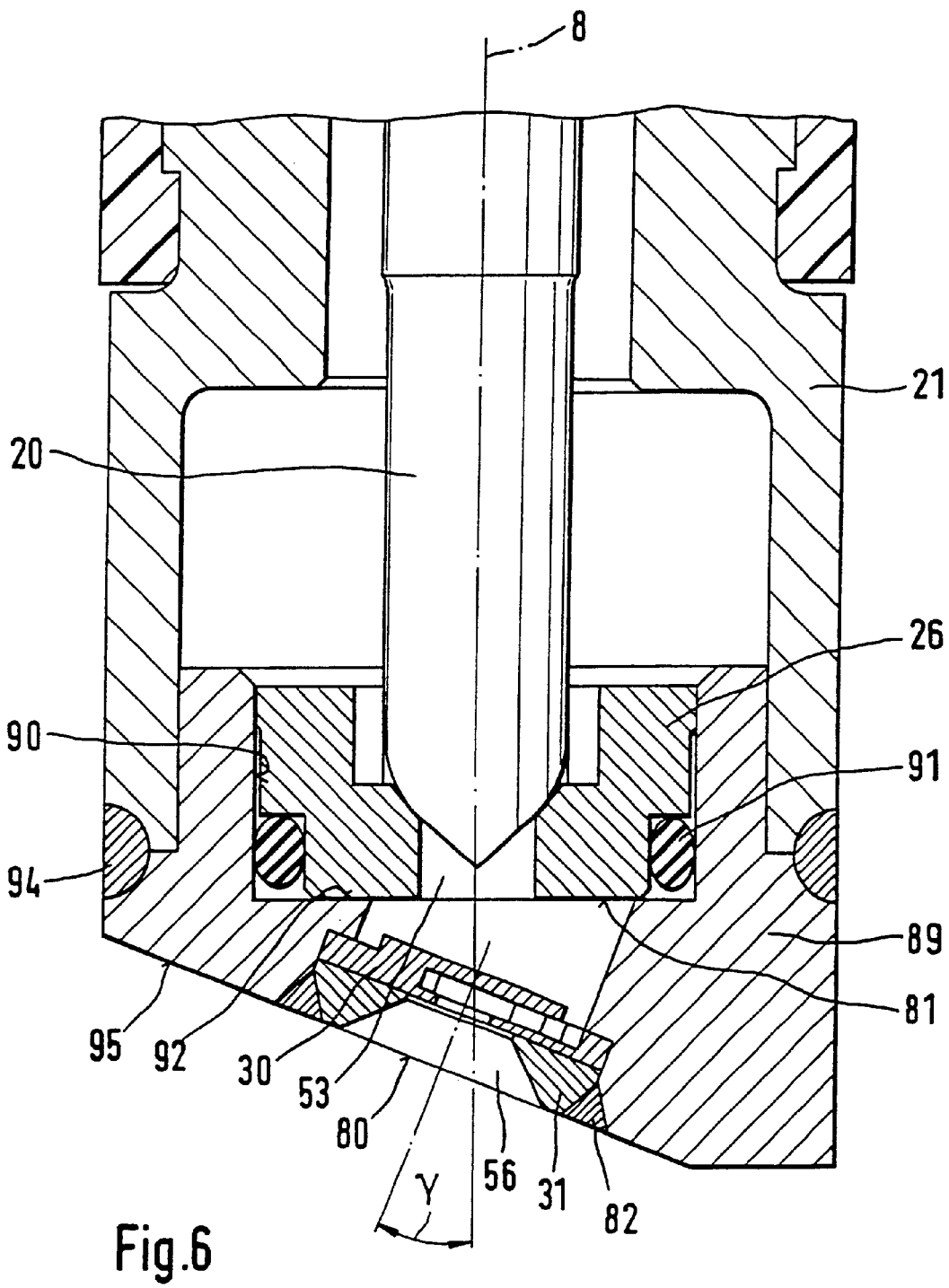
FIG. 6 shows a fourth embodiment of a downstream valve end according to the present invention.
Figure 7:
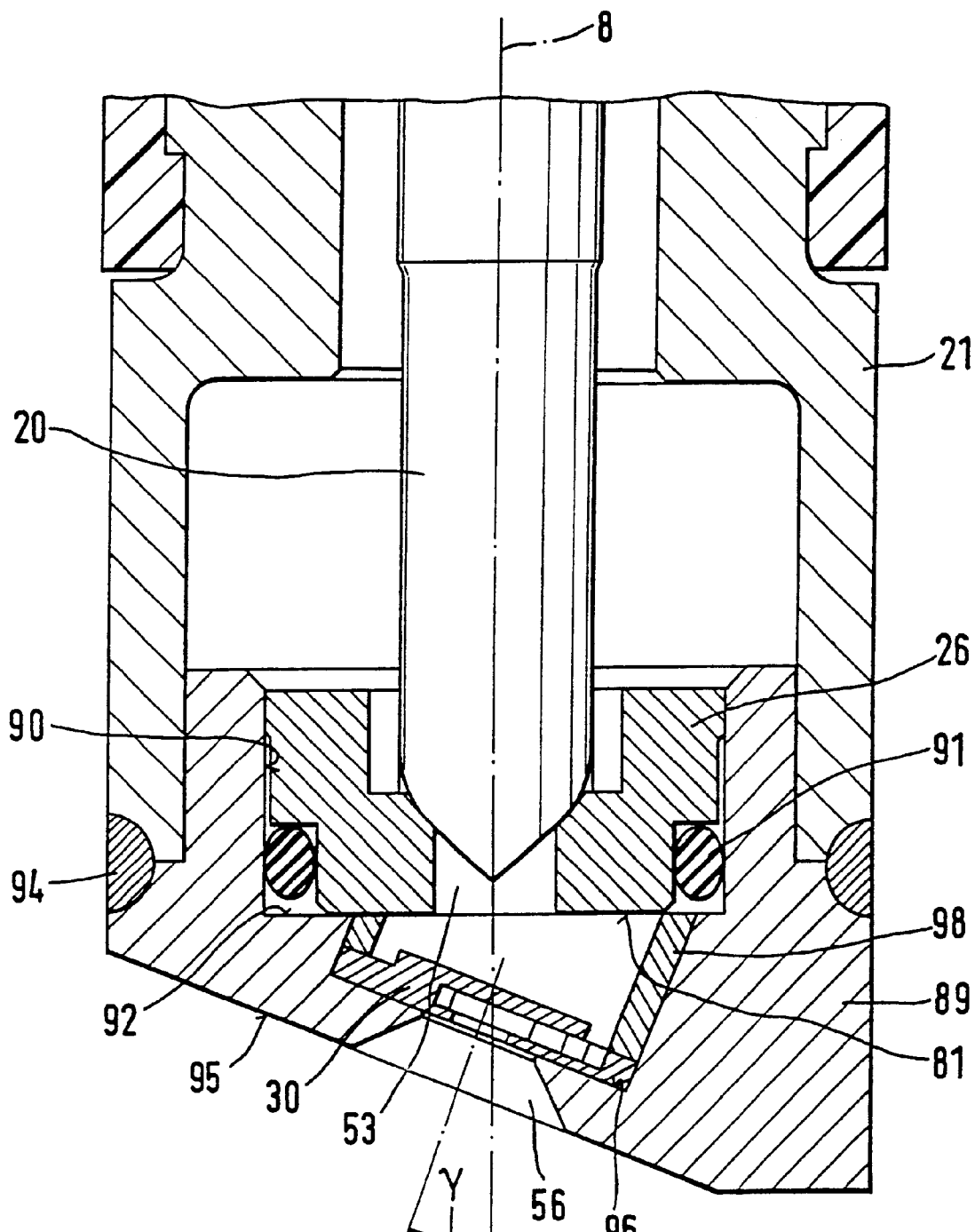
FIG. 7 shows a fifth embodiment of a downstream valve end according to the present invention.

FIGS. 6 and 7 show another installation principle, in which an additional mounting element 89 is used at the valve end. Valve seat element 26 itself has no depression 54 downstream from outlet opening 53. Rather valve seat element 26 itself is sealingly inserted into mounting element 89 in an internal opening 90 via a gasket 91 and attached by laser welding, pressing, shrink-fitting, hard soldering, diffusion soldering, or magnet molding, bottom face 81 of valve seat element 26 being supported by shoulder 92. Viewed in the downstream direction, opening 90 is cylindrical and rotationally symmetrical with respect to longitudinal valve axis 8 up to shoulder 92, while opening 90 runs at an angle to longitudinal valve axis 8 downstream from shoulder 92. This bottom section of opening 90 is used to accommodate swirl disk 30. In contrast to the examples previously described, swirl disk 30 is now designed so that the two bottom layers 61 and 62 define an outer joint diameter of swirl disk 30, so that they fit exactly in opening 90 of mounting element 89. Mounting element 89 and valve seat carrier 21 are, for example, firmly joined using a peripheral weld 94. Valve seat element 26 also assumes the function of guiding valve needle 20, so that no guide element 35 is needed.

In both embodiments, mounting element 89 has a bottom face 95, inclined at an angle with respect to longitudinal valve axis 8. Bottom face 80 of support element 31 also ends flush with this face 95, the two being attached via weld 82 in the area of faces 80 and 95 (FIG. 6). In the example of FIG. 7, support element 31 is not used. Outlet opening 56, which may be conical, for example, is provided directly in mounting element 89. In the bottom inclined section of opening 90, an additional shoulder 96, where swirl disk 30 rests, is formed after shoulder 92, whereby lower support is no longer needed. However, a tubular spacer sleeve 98 is installed between lower face 81 of valve seat element 26 and swirl disk 30, in particular the outer limit of middle layer 61, so that accurate positioning of swirl disk 30 is ensured. While swirl disk 30 is installed from below in the example of FIG. 6, it is installed from above in the example of FIG. 7.

Figure 8:
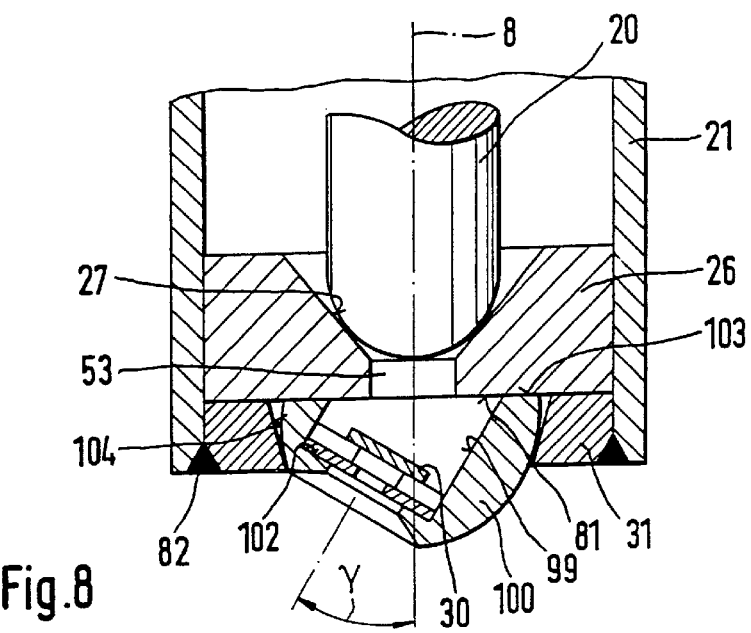
FIG. 8 shows a sixth embodiment of a downstream valve end according to the present invention.

In the embodiment illustrated in FIG. 8, swirl disk 30 is mounted in an opening 99 of a spherical part 100 downstream from valve seat 27. A metal ball such as is used for ball bearings, with a central bore hole can be used as spherical part 100. Opening 99 is shaped so that a shoulder 102 is formed, on which swirl disk 30 rests. The assembly procedure is briefly described below. On the inlet side, the first ball is ground to produce a flat surface. The normal to flat surface 103 is inclined with respect to the axis of opening 99 in spherical part 100 at an angle γ. Spherical part 100 is placed into a disk-shaped support element 31, which has a mounting hole 104, which tapers in the downstream direction. The tolerances of spherical part 100 and support element 31 with its mounting hole 104 are designed so that flat polished surface 103 of spherical part 100 slightly protrudes from support element 31 before spherical part 100 is inserted.

Support element 31 is pushed into valve seat carrier 21 with spherical part 100 inserted. Flat surface 103 of spherical part 100 is pushed from below against bottom face 81 of valve seat element 26. By support element 31 being axially pressed against valve seat element 26, spherical part 100 is pressed into mounting hole 104 until flat surface 103 ends exactly flush with support element 31 up to valve seat element 26. In order to achieved the required seal, a flat gasket is placed or a glue is applied, for example, between valve seat element 26 and support element 31. The attachment between support element 31 and valve seat carrier 21 is achieved using annular weld 82.

Figure 9:
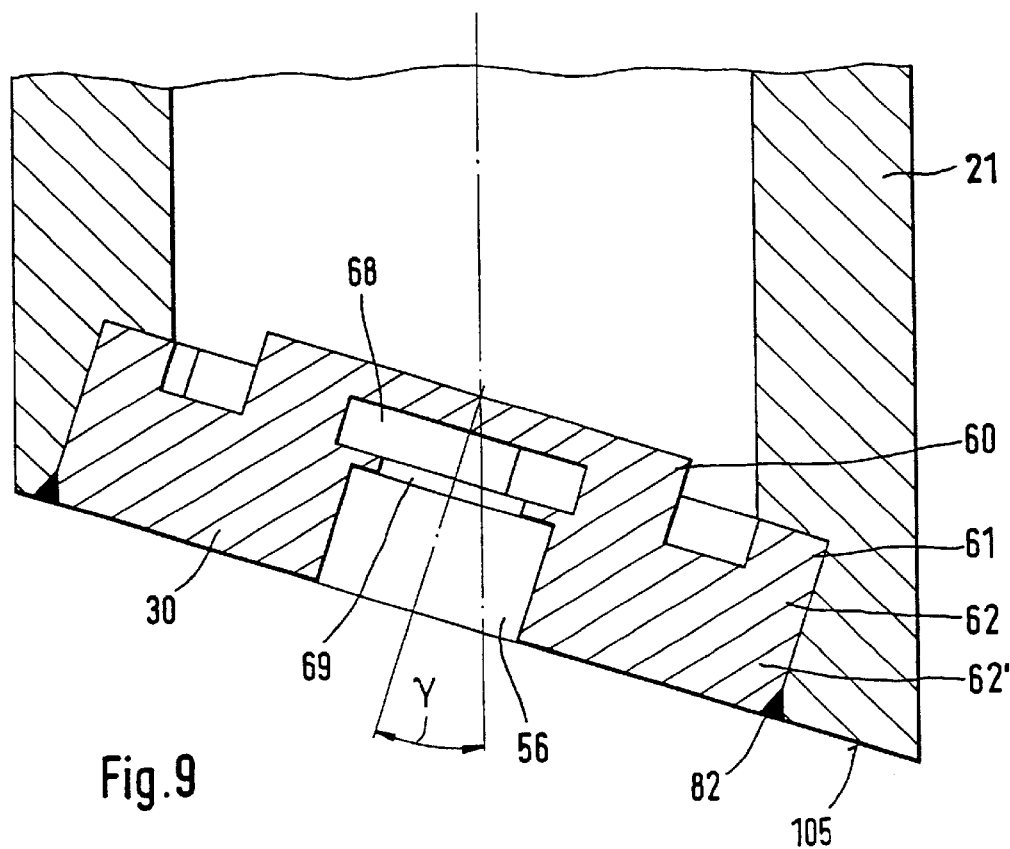
FIG. 9 shwos a seventh embodiment of a downstream valve and according to the present invention.

FIG. 9 shows a seventh embodiment of a valve end having a swirl disk 30 that is mounted obliquely; this embodiment is characterized by the fact that no additional component having outlet opening 56 is arranged downstream from swirl disk 30. Rather, fuel is directly injected into the combustion chamber from swirl disk 30. For this purpose, swirl disk 30 has four layers, a considerable part of the thickness of swirl disk 30 is represented by a bottom layer 62', which, in the downstream direction, follows bottom layer 62 having outlet opening 69. Bottom layer 62' assumes, in a way, the function of a perforated spray disk or the above-described support element 31, since outlet opening 56, designed as a spray hole, is still present in bottom layer 62' of swirl disk 30. Starting at the attachment, this embodiment is comparable to that of FIG. 6, with swirl disk 30 being attachable directly to valve seat carrier 21, which here also has an oblique bottom side 105.

In addition to swirl disk 30, which has been described in detail, and which is very much preferred, other embodiments of atomizer disks, such as a disk having an offset of the inlet and outlet and thus producing an "S effect," which can be made of metal as a multilayer electroplated disk or as a laminated metal sheet disk or made of silicon, or can also be used as a stamped perforated spray disk in fuel injection valves at an inclination to longitudinal valve axis 8. In addition to the above-described multilayer atomizer disks, single-layer perforated disks can also be suitably installed in a fuel injection valve.

What is claimed is:

1. A fuel injection valve for a fuel injection system of an internal combustion engine, comprising:

an actuator;

a movable valve part actuated by the actuator;

a stationary valve seat formed on a valve seat element, the movable valve part interacting with the valve seat to open and close the fuel injection valve; and an atomizer disk arranged downstream from the valve seat, the atomizer disk having a normal to a surface of the atomizer disk that is at an angle to a longitudinal axis of the fuel injection valve so that a jet angle with respect to the longitudinal valve axis is achieved due to an orientation of the atomizer disk, the angle being different from 0°.

2. The fuel injection valve according to claim 1, wherein the fuel injection valve directly injects fuel into a combustion chamber of the internal combustion engine.

3. The fuel injection valve according to claim 1, wherein the atomizer disk is a swirl disk having a swirl chamber and at least two swirl channels opening into the swirl chamber.

4. The fuel injection valve according to claim 3, wherein the atomizer disk further includes a perforated spray disk in combination with the swirl disk.

5. The fuel injection valve according to claim 1, wherein the atomizer disk is an S type disk having and inlet and an outlet offset with respect to each other.

6. The fuel injection valve according to claim 1, wherein the atomizer disk includes a plurality of layers, the plurality of layers being adheringly produced by electroplating directly on top of one another.

7. The fuel injection valve according to claim 1, wherein the atomizer disk includes a plurality of layers, the plurality of layers including at least two sheet metal layers arranged on top of one another.

8. The fuel injection valve according to claim 1, wherein the atomizer disk is arranged in a depression of the valve seat element.

9. The fuel injection valve according to claim 8, further comprising:

a support element, the atomizer disk being secured in the depression via the support element.

10. The fuel injection valve according to claim 1, further comprising:

a mounting element, the atomizer disk being arranged in a hole of the mounting element downstream from the valve seat element.

11. The fuel injection valve according to claim 10, wherein the atomizer disk is secured in the hole of the mounting element via one of a support element and a spacer sleeve.

12. The fuel injection valve according to claim 1, further comprising:

a spherical part, the atomizer disk being arranged in a hole of the spherical part downstream from the valve seat element.

13. The fuel injection valve according to claim 12, further comprising:

a support element, the spherical part being pressed into a conical mounting hold of the support element.

14. The fuel injection valve according to claim 1, further comprising:

a mounting element, the valve seat element being fastened in the mounting element using one of laser welding, pressing, shrinking, hard soldering, diffusion soldering, gluing and magnetically.

* * * * *